(12) United States Patent
Feldschuh

(10) Patent No.: US 9,767,127 B2
(45) Date of Patent: Sep. 19, 2017

(54) METHOD FOR RECORD LINKAGE FROM MULTIPLE SOURCES

(71) Applicant: Outseeker Corp., NY, NY (US)

(72) Inventor: Jonathan Feldschuh, New York, NY (US)

(73) Assignee: Outseeker Corp., New York, NY (US)

( * ) Notice: Subject to any disclaimer, the term of this patent is extended or adjusted under 35 U.S.C. 154(b) by 530 days.

(21) Appl. No.: 14/249,773

(22) Filed: May 2, 2014

(65) Prior Publication Data

US 2014/0330845 A1 Nov. 6, 2014

Related U.S. Application Data

(60) Provisional application No. 61/818,549, filed on May 2, 2013.

(51) Int. Cl.
*G06F 17/30* (2006.01)
(52) U.S. Cl.
CPC .............................. *G06F 17/30303* (2013.01)
(58) Field of Classification Search
CPC .................... G06F 3/0641; G06F 17/30303
See application file for complete search history.

(56) References Cited

U.S. PATENT DOCUMENTS

| | | | |
|---|---|---|---|
| 6,523,019 B1 * | 2/2003 | Borthwick | G06N 99/005 706/45 |
| 6,523,041 B1 | 2/2003 | Morgan et al. | |
| 6,658,412 B1 | 12/2003 | Jenkins et al. | |
| 6,938,053 B2 | 8/2005 | Jaro | |
| 6,961,721 B2 | 11/2005 | Chaudhari et al. | |
| 7,076,485 B2 | 7/2006 | Bloedorn | |
| 7,152,060 B2 | 12/2006 | Borthwick et al. | |
| 7,403,936 B2 | 7/2008 | Giang et al. | |
| 7,403,942 B1 | 7/2008 | Bayliss | |
| 7,406,479 B2 | 7/2008 | Shriraghav et al. | |
| 7,627,550 B1 | 12/2009 | Adams et al. | |
| 7,657,540 B1 | 2/2010 | Bayliss | |
| 7,685,090 B2 | 3/2010 | Chaudhari et al. | |
| 7,685,093 B1 | 3/2010 | Adams et al. | |
| 7,698,268 B1 | 4/2010 | Adams et al. | |

(Continued)

OTHER PUBLICATIONS

Huang, Extensions to the k-Means Algorithm for Clustering Large Data Sets with Categorical Values, Data Mining and Knowledge Discovery, pp. 283-304 (1998).*

(Continued)

*Primary Examiner* — Albert Phillips, III
(74) *Attorney, Agent, or Firm* — McCarter & English, LLP

(57) ABSTRACT

Embodiments of methods for record linkage and comparing attributes are presented herein. Broadly speaking, embodiments of the present invention associate data records using distance measures and weights. More particularly, embodiments of the present invention generate a weight-based comparison of attributes. More specifically, embodiments of the present invention involve deduplication of records in a single database and linkage of records in multiple databases. In some embodiments of the invention, records may be merged into a master database based on the linkage and comparison of attributes. In addition, embodiments of the present invention may calculate a quality measure to be used in comparing attributes and records.

16 Claims, 13 Drawing Sheets

301

| a.id | name | phone | address | field.X | ... |
|---|---|---|---|---|---|
| a005382 | Hunan's Kitchen | NA | 1003 Columbus Ave | 8 | ... |
| a012744 | Wo Hop Restaurant | 212-566-3841 | 15 Mott St | 5 | ... |
| ... | ... | ... | ... | ... | ... |

302

| b.id | name | phone | address | field.Y | ... |
|---|---|---|---|---|---|
| b0177 | Wo Hop Restaurant | 212-566-3841 | 15 Mott St | 20 | ... |
| b0689 | Hunan's Kitchen | 212-222-1118 | NA | 40 | ... |
| ... | ... | ... | ... | ... | ... |

303

| L.id | a.id | b.id |
|---|---|---|
| L00378 | a012744 | b0177 |
| L00546 | a005382 | b0689 |
| ... | ... | ... |

304

| id | name | phone | address | field.X | field.Y | ... |
|---|---|---|---|---|---|---|
| L00378 | Wo Hop Restaurant | 212-566-3841 | 15 Mott St | 5 | 20 | ... |
| L00546 | Hunan's Kitchen | 212-222-1118 | 1003 Columbus Ave | 8 | 40 | ... |
| ... | ... | ... | ... | ... | ... | ... |

(56) References Cited

U.S. PATENT DOCUMENTS

| | | |
|---|---|---|
| 7,912,842 B1 | 3/2011 | Bayliss |
| 7,933,909 B2 | 4/2011 | Trepetin |
| 8,032,546 B2 | 10/2011 | Arasu et al. |
| 8,046,339 B2 | 10/2011 | Chaudhari et al. |
| 8,046,362 B2 | 10/2011 | Bayliss |
| 8,108,326 B2 | 1/2012 | Veeramachaneni |
| 8,135,681 B2 | 3/2012 | Bayliss |
| 8,135,719 B2 | 3/2012 | Bayliss |
| 8,160,984 B2 | 4/2012 | Hunt et al. |
| 8,190,538 B2 | 5/2012 | Zhang et al. |
| 8,190,616 B2 | 5/2012 | Bayliss |
| 8,200,640 B2 | 6/2012 | Arasu et al. |
| 8,204,866 B2 | 6/2012 | Chaudhari et al. |
| 8,209,268 B2 | 6/2012 | Zelenko |
| 8,250,078 B2 | 8/2012 | Bayliss |
| 8,266,168 B2 | 9/2012 | Bayliss |
| 8,275,770 B2 | 9/2012 | Bayliss |
| 8,346,794 B2 | 1/2013 | Cheng et al. |
| 8,352,496 B2 | 1/2013 | Johnston |
| 8,359,339 B2 | 1/2013 | Adams et al. |
| 8,364,692 B1 | 1/2013 | Allen et al. |
| 8,370,355 B2 | 2/2013 | Harger et al. |
| 8,370,366 B2 | 2/2013 | Adams et al. |
| 8,392,460 B2 | 3/2013 | Hoang et al. |
| 2005/0262044 A1 | 11/2005 | Chaudhari et al. |
| 2006/0184584 A1 | 8/2006 | Dunn et al. |
| 2007/0174277 A1 | 7/2007 | Giang et al. |
| 2007/0299697 A1 | 12/2007 | Friedlander et al. |
| 2008/0133502 A1 | 6/2008 | Gurevich et al. |
| 2008/0243885 A1 | 10/2008 | Harger et al. |
| 2009/0012971 A1 | 1/2009 | Hunt et al. |
| 2009/0089630 A1 | 4/2009 | Goldenberg et al. |
| 2009/0106245 A1 | 4/2009 | Salcedo |
| 2009/0132236 A1 | 5/2009 | Kislyuk et al. |
| 2009/0132504 A1 | 5/2009 | Vegnaduzzo et al. |
| 2009/0132511 A1 | 5/2009 | Yang et al. |
| 2009/0132513 A1 | 5/2009 | McKee et al. |
| 2009/0216689 A1 | 8/2009 | Zelenko |
| 2009/0271363 A1 | 10/2009 | Bayliss |
| 2009/0287689 A1 | 11/2009 | Bayliss |
| 2010/0094910 A1 | 4/2010 | Bayliss |
| 2010/0198756 A1 | 8/2010 | Zhang et al. |
| 2011/0099351 A1* | 4/2011 | Condict ............... G06F 3/0608 711/216 |
| 2011/0191353 A1 | 8/2011 | L'Heureux et al. |
| 2012/0102057 A1 | 4/2012 | Johnston |
| 2012/0158807 A1* | 6/2012 | Woody ............... G06F 17/3015 708/204 |
| 2012/0173546 A1 | 7/2012 | Bayliss |
| 2012/0226692 A1 | 9/2012 | Kazi et al. |
| 2012/0278263 A1 | 11/2012 | Borthwick et al. |
| 2012/0278340 A1 | 11/2012 | Bayliss |
| 2014/0229456 A1* | 8/2014 | Hollifield ......... G06F 17/30371 707/697 |

OTHER PUBLICATIONS

Costa, An incremental clustering scheme for data de-duplication, 2010, pp. 152-187.*

* cited by examiner

301

| a.id | name | phone | address | field.X | ... |
|---|---|---|---|---|---|
| a005382 | Hunan's Kitchen | NA | 1003 Columbus Ave | 8 | ... |
| a012744 | Wo Hop Restaurant | 212-566-3841 | 15 Mott St | 5 | ... |
| ... | ... | ... | ... | ... | ... |

302

| b.id | name | phone | address | field.Y | ... |
|---|---|---|---|---|---|
| b0177 | Wo Hop Restaurant | 212-566-3841 | 15 Mott St | 20 | ... |
| b0689 | Hunan's Kitchen | 212-222-1118 | NA | 40 | ... |
| ... | ... | ... | ... | ... | ... |

303

| L.id | a.id | b.id |
|---|---|---|
| L00378 | a012744 | b0177 |
| L00546 | a005382 | b0689 |
| ... | ... | ... |

304

| id | name | phone | address | field.X | field.Y | ... |
|---|---|---|---|---|---|---|
| L00378 | Wo Hop Restaurant | 212-566-3841 | 15 Mott St | 5 | 20 | ... |
| L00546 | Hunan's Kitchen | 212-222-1118 | 1003 Columbus Ave | 8 | 40 | ... |
| ... | ... | ... | ... | ... | ... | ... |

FIG. 3

| Pass | blocking fields | max.distance (multiple) | max.distance (unique) | distance fields | attribute weights |
|---|---|---|---|---|---|
| 1 | phone | 0.2 | 0.4 | name | 0.50 |
| | | | | address | 0.25 |
| | | | | lat.lon | 0.25 |
| 2 | website | 0.4 | 0.6 | name | 0.50 |
| | | | | address | 0.25 |
| | | | | lat.lon | 0.25 |
| 3 | name | 0.3 | 0.5 | address | 0.50 |
| | | | | lat.lon | 0.50 |
| 4 | zip | 0.3 | 0.3 | name | 0.50 |
| | | | | address | 0.25 |
| | | | | lat.lon | 0.25 |
| 5 | phone | 0.3 | 0.6 | name | 0.50 |
| | | | | address | 0.50 |
| 6 | zip & adr1 | 0.3 | 0.3 | website | 1.00 |
| 7 | phone | 0.3 | 0.6 | name | 0.50 |
| | | | | address | 0.25 |
| | | | | lat.lon | 0.25 |

FIG. 5

601 — Pairwise Record Distance for records in a block

|      | a101 | a102 | a103 | a104 |
|------|------|------|------|------|
| a101 | 0    | 0.2  | 0.6  | 0.7  |
| a102 | 0.2  | 0    | 0.5  | 0.5  |
| a103 | 0.6  | 0.5  | 0    | 0.3  |
| a104 | 0.7  | 0.5  | 0.3  | 0    |

602 — Pairwise Record Distance for merged records from original block

|           | a101.a102 | a103.a104 |
|-----------|-----------|-----------|
| a101.a102 | 0         | 0.5       |
| a103.a104 | 0.5       | 0         |

| a.id | sort.key | name | phone | num.reviews | address |
|---|---|---|---|---|---|
| a012744 | 10013 | Wo Hop Restaurant | 212-566-3841 | 60 | 15 Mott St |
| a012745 | 10013 | Wo Hop Restaurant | 212-267-2536 | 408 | 17 Mott St |
| a005382 | 10025 | Hunan's Kitchen | 212-222-1118 | 5 | 1003 Columbus Ave |
| a005385 | 10025 | Hunan Chen's Kitchen | 212-222-1118 | 0 | 1003 A Columbus Ave |
| a004394 | 10038 | Friendly Gourmet Pizza | 212-791-1800 | 8 | 59 Nassau St Bsmt |
| a004395 | 10038 | Friendly Pizzeria | 212-962-0220 | 3 | 59 Nassau Street Bsmt |
| a005634 | 10464 | J P's Restaurant | 718-885-3364 | 0 | 703 Minnieford Avenue |
| a005903 | 10464 | JP's Restaurant | 718-885-3364 | 24 | 703 Minnieford Ave |

702

| a.id | sort.key | name | phone | num.reviews | address |
|---|---|---|---|---|---|
| a012745 | 10013 | Wo Hop Restaurant | 212-267-2536 | 408 | 17 Mott St |
| a005382 | 10025 | Hunan's Kitchen | 212-222-1118 | 5 | 1003 Columbus Ave |
| a004394 | 10038 | Friendly Gourmet Pizza | 212-791-1800 | 8 | 59 Nassau St Bsmt |
| a005903 | 10464 | JP's Restaurant | 718-885-3364 | 24 | 703 Minnieford Ave |

FIG. 7

1001 binary distance metric

| case | TT | TF | FF | TN | FN | NN |
|---|---|---|---|---|---|---|
| distance.1 | 0 | 1 | 0 | NA | NA | NA |
| distance.2 | 0 | 1 | 0 | 1 | 1 | 0 |
| distance.3 | 0 | 1 | 0 | 0.5 | 0.5 | NA |

1002 categorical distance metric

| case | BY | BG | YG | BB | YY | GG |
|---|---|---|---|---|---|---|
| distance | 1 | 0.5 | 0.5 | 0 | 0 | 0 |

| a.id | name | phone | address | quality | ... |
|---|---|---|---|---|---|
| a012744 | Wo Hop Restaurant | 212-566-3841 | 15 Mott St | 10 | ... |
| ... | ... | ... | ... | | ... |

1102 B

| b.id | name | phone | address | quality | ... |
|---|---|---|---|---|---|
| b0177 | Wo Hop Restaurant | 212-566-9999 | 17 Mott St | 10 | ... |
| ... | ... | ... | ... | | ... |

1103 C

| c.id | name | phone | address | quality | ... |
|---|---|---|---|---|---|
| c0425 | Wu Hop | 212-566-3841 | 17 Mott St | 15 | ... |
| ... | ... | ... | ... | | ... |

1104 Database Quality

| A | B | C |
|---|---|---|
| 1 | 2 | 1 |

1105 Entry Quality

| name | Wu Hop | Wo Hop Restaurant |
|---|---|---|
| Quality: | 15 | 30 |

1106

| phone | 212-566-3841 | 212-566-9999 |
|---|---|---|
| Quality: | 25 | 20 |

1107

| address | 15 Mott St | 17 Mott St |
|---|---|---|
| Quality: | 10 | 35 |

1108 M

| name | phone | address |
|---|---|---|
| Wo Hop Restaurant | 212-566-3841 | 17 Mott St |

FIG. 11

| A.id | B.id | dist.A.B | a.phone | b.phone | a.name | b.name | a.address | b.address | a.lat | b.lat | a.lon | b.lon |
|---|---|---|---|---|---|---|---|---|---|---|---|---|
| a001705 | b002452 | 0.133 | 212-957-1899 | 212-957-1899 | Fifty Five | Suite 55 | 47 W. 55th St. | 47 West 55th Street | 40.7626 | 40.7625 | -73.9769 | -73.9764 |
| a002353 | b001844 | 0.193 | 212-299-3900 | 212-299-3900 | Jean Georges' Nougatine | Nougatine at Jean Georges | 1 Central Park W. | 1 Central Park West | 40.7689 | 40.7685 | -73.9812 | -73.9816 |
| a004477 | b002405 | 0.174 | 212-620-4585 | 212-620-4585 | Spice | Spice - Chelsea | 236 Eighth Ave. | 236th 8th Ave | 40.7446 | 40.7453 | -73.9986 | -74.0026 |
| a002097 | b001168 | 0.211 | 212-785-6850 | 212-785-6850 | Haru | Haru Sushi - Wall Street | 1 Wall Street Ct. | One Wall Street Court | 40.7048 | 40.7060 | -74.0090 | -74.0074 |
| a001798 | b001392 | 0.424 | 212-333-5300 | 212-333-5300 | Fragolino Restaurant | La Carafe | 653 9th Ave | 653 9th Avenue | 40.7607 | 40.7607 | -73.9910 | -73.9910 |
| a003583 | b002663 | 0.429 | 212-546-5300 | 212-546-5300 | Palm Court | The Palm Court at The Plaza Hotel | 768 Fifth Ave. | Fifth Avenue at Central Park South | 40.7643 | 40.7645 | -73.9742 | -73.9737 |
| a004361 | b002493 | 0.455 | 212-307-1363 | 212-307-1363 | Siam Grill Restaurant | Talent Thai II | 592 9th Ave | 592 Ninth Avenue | 40.7587 | 40.7588 | -73.9921 | -73.9924 |
| a004384 | b002546 | 0.457 | 718-575-0983 | 718-575-0983 | Simply Thai Restaurant | Thai Boulevard Restaurant | 11816 Queens Blvd | 118-16 Queens Blvd. | 40.7148 | 40.7148 | -73.8324 | -73.8322 |
| a000943 | b002616 | 0.487 | 212-422-1965 | 212-422-1965 | Captains Ketch the | The Ketch | 181 Pearl St | 181 Pearl Street | 40.7064 | 40.7063 | -74.0071 | -74.0072 |
| a001027 | b002022 | 0.508 | 212-819-0095 | 212-819-0095 | Channel 4 Restaurant | Pig N Whistle - Rockefeller Center | 58 W 48th St | 58 W 48 street | 40.7582 | 40.7582 | -73.9804 | -73.9803 |
| a001909 | b001567 | 0.514 | 212-891-8100 | 212-891-8100 | Gilt | Madison Room and Bar | 455 Madison Ave. | 455 Madison Ave | 40.7583 | 40.7580 | -73.9752 | -73.9755 |
| a004046 | b000037 | 0.524 | 212-339-4050 | 212-339-4050 | Regency | 540 Park at Loews Regency Hotel | 540 Park Ave. | 540 Park Avenue | 40.7646 | 40.7643 | -73.9694 | -73.9689 |
| a002485 | b001347 | 0.581 | 718-638-3366 | 718-638-3366 | Kiku | Kiku Asian Bistro | 177 5th Ave | 2 Lincoln Place (163 5th Ave.) | 40.6773 | 40.6775 | -73.9798 | -73.9793 |

FIG. 12

METHOD FOR RECORD LINKAGE FROM MULTIPLE SOURCES

CROSS-REFERENCE TO RELATED APPLICATIONS

This application claims priority to and the benefit of the filing of U.S. Provisional Patent Application Ser. No. 61/818,549, entitled "Record Linkage from Multiple Sources", by Jonathan Feldschuh, filed on May 3, 2013, and the specification thereof is incorporated herein by reference.

BACKGROUND OF THE INVENTION

Field of the Invention (Technical Field)

This invention relates generally to associating data records and in particular to identifying data records that may contain the same entity such that these data records may be associated. Even more particularly, this invention relates to the standardization and comparison of attributes within data records.

Background

In today's day and age, the vast majority of businesses retain extensive amounts of data regarding various aspects of their operations, such as inventories, customers, products, etc. Data about entities, such as people, products, parts or anything else may be stored in digital format in a data store such as a computer database. These computer databases permit the data about an entity to be accessed rapidly and permit the data to be cross-referenced to the relevant pieces of data about the same entity. The databases also permit a person to query the database to find data records pertaining to a particular entity, such that data records from various data stores pertaining to the same entity may be associated with one another.

A data store, however, has several limitations, which may limit the ability to find the correct data about an entity within that data store. The actual data within the data store is only as accurate as the person who entered the data, or an original database. Thus, a mistake in the entry of the data into the data store may cause a search for data about an entity in the database to miss relevant data about the entity because, for example, a last name of a person was misspelled or a social security number was entered incorrectly, one or more attributes are missing, etc. A whole host of these types of problems may be imagined: two separate records for an entity that already has a record within the database may be created such that several data records may contain information about the same entity, but, for example, the names or identification numbers contained in the two data records may be different so that it may be difficult to associate the data records referring to the same entity with one another.

There are several problems, which limit the ability to find all of the relevant data about an entity in such a database. For example, multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records, which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

For multiple data stores, such as websites or apps each operating their own databases containing a large number of data records, the ability to locate all relevant information about a particular entity within and among the respective databases is very important, but not easily obtained. For example, were one database to have the location of an entity like a restaurant and another not, a user searching only the latter database will miss the location information. Also, like the situation with a single database, any mistake in the entry of data including without limitation the creation of more than one data record for the same entity at any information source may cause relevant data to be missed when the data for a particular entity is searched for in the database. In addition, in cases involving multiple information sources, each of the information sources may have slightly different data syntax or formats, which may further complicate the process of finding data among the databases.

To reduce the amount of data that must be reviewed and prevent the user from picking the wrong data record, it is also desirable to identify and associate data records from the various information sources that may contain information about the same entity. This process is commonly referred to as "record linkage".

The process of combining potentially incomplete information from multiple records in a single database is often referred to as "deduplication". The association of multiple records from separate databases that can contain possibly incomplete, complementary, overlapping, or conflicting information is referred to as "linkage". Since these two processes are both essential parts of the work of creating the best combined view of information from multiple sources, they are both considered aspects of record linkage. These two problems of deduplication and linkage share the common problem of first assessing record similarity, also referred to as record distance. In the case of deduplication matching records are either merged or deleted. In the case of linkage, either a link between the records or a merged master record is formed.

There are conventional systems for record linkage that are capable of deduplication, but these systems only locate data records which are identical to each other or use a fixed set of rules to determine if two records are identical. Thus, these conventional systems cannot determine if two data records, with, for example, slightly different last names, nevertheless contain information about the same entity. Other conventional methods are designed to solve this problem such as phonetic methods and string distance methods. Another approach is to break data up into smaller units or tokens, which can then be matched at a higher rate. While an improvement over record linkage of identical records, none of these methods is capable of perfect record linkage.

There have also been efforts to standardize data. For example, the U.S. Post Office has a standardized format for addresses that covers abbreviations, ordering of information, use of special characters. In the event that it was ever necessary to combine that data with another source of data concerning the same entities, the new set of data might not conform to the same standards. This would be an instance where better methods of record linkage would be useful.

People expect to plug in information on a web page or app and get the desired results quickly and accurately. In many cases, this is possible, but there are situations in which this process could be enhanced dramatically with a system that deduplicates, links and aggregates the data from multiple sources into a master database and presents more complete and accurate data to the user in a fashion not possible by searching a single website or app. For example, if an internet user wants to locate a restaurant to visit, the user has an array of search options, website and apps, to choose from, but each of these options uses its own unique database containing its own unique rating system and body of data upon which results will be generated. Thus, a user could search two, three, four or more different well-known sites for information about restaurants and get very different information in terms of, for example, price, location, and other subjective qualities that users of such sites or databases have provided. A user might also receive incomplete or incorrect information in a related attribute such as location or cost. Similarly, multiple sites might have different information to display about each restaurant, e.g., one site might display a star based recommendation system, whereas another might not.

More generally, it would also be desirable for users to be able to search a single source for information pertaining to entities, such as restaurants, and obtain more reliable, extensive, and complete data records from a plurality of information sources, which pertain to the same entity, despite discrepancies between attributes of these data records.

From the above it is clear that there is a need for a new methods of record linkage for data stores that solve the problems inherent in deduplication and linkage with respect to databases, particularly those relating to online websites or apps providing user ratings or other quality measures. It is to this end that embodiments of the present invention are directed.

There is also a need for improved techniques for comparing attributes during deduplication or record linkage as well as choosing the best attribute for use in a merge of linked records into a new database.

BRIEF SUMMARY OF EMBODIMENTS OF THE PRESENT INVENTION

The present invention extends or improves upon conventional methods of record linkage. Embodiments of the present invention are particularly applicable to the problem of record linkage between multiple dynamic data stores. More particularly, embodiments of the present invention relate to improved deduplication and linkage techniques. Even more particularly, embodiments of the present invention involve methods of determining distance measures and/or standardization and distance measures, which can be utilized to compare records for purposes of deduplication and linkage.

Embodiments of the present invention also provide improved techniques for comparing attributes during deduplication or record linkage as well as choosing the best attribute for use in a merge of linked records into a new database. Particularly, embodiments of the present invention involve determining a quality measure for both individual database reliability and individual record reliability, which can be combined to calculate a total quality measure representing the best and most reliable match of attributes and records.

Embodiments of the present invention can be used as a solution for users searching only inadequate data stores for information about entities, such as restaurants or people, by deduplicating single databases, linking multiple databases, and merging linked databases in a manner that presents more complete and reliable information concerning the entities.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE SEVERAL VIEWS OF THE DRAWINGS

The drawings, which are incorporated herein, illustrate one or more embodiments of the present invention, thus helping to better explain one or more aspects of the one or more embodiments. As such, the drawings are not to be construed as limiting any particular aspect of any embodiment of the invention. In the drawings:

FIG. 3 depicts a representation of 4 data tables exemplifying the deduplication and linkage according to one embodiment.

FIG. 5 depicts a representation of a data table with example parameters for the deduplication and linkage process according to one embodiment.

FIG. 6 depicts a representation of two tables as examples of how pairwise record distances are compared to threshold values in one embodiment.

FIG. 7 depicts a representation of two data tables as examples of the process of merging attributes during deduplication according to one embodiment.

FIG. 10 depicts a representation of two data tables as examples of how distance and standardization of measures is performed according to one embodiment.

FIG. 11 depicts a representation of eight data tables as examples of how quality measures can be used to improve the deduplication and linkage processes according to one embodiment.

FIG. 12 depicts a representation of one data table as an example of the results of the linkage process according to one embodiment.

DETAILED DESCRIPTION OF THE INVENTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like elements.

The term "attribute" is used consistently throughout this document even in text where the term "field" might be more appropriate. This is done to improve the readability and understanding of the invention and so as not to limit the scope of the patent to any particular type of database that might be used to practice an embodiment of this invention. One of ordinary skill in the art will recognize that the terms, despite sometimes having slightly different definitions, are commonly used interchangeably in the art. To the extent one of ordinary skill in the art believes any particular portion of the text should use the term "field" instead of "attribute" when attempting to practice an embodiment of the invention, he should consider that text as though the term "field" was used instead.

Figure 1:
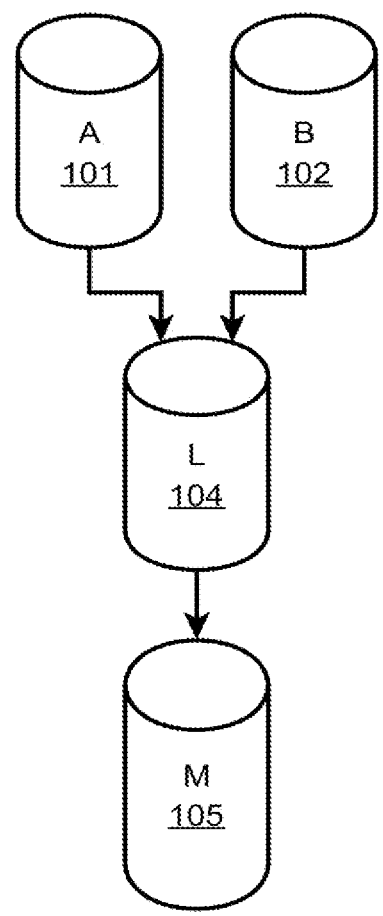
FIG. 1 schematically shows the process of data linkage and merge using four database structures according to one embodiment.

An embodiment of the invention is shown in the schematic process of FIG. 1, which depicts two unlinked databases, 101 and 102, a linkage database 104, and a master database 105. In FIG. 1, two unlinked databases tables 101 and 102 are first linked by the creation of a linkage database 104. All three databases are then merged to create a master database of merged records.

Figure 2:
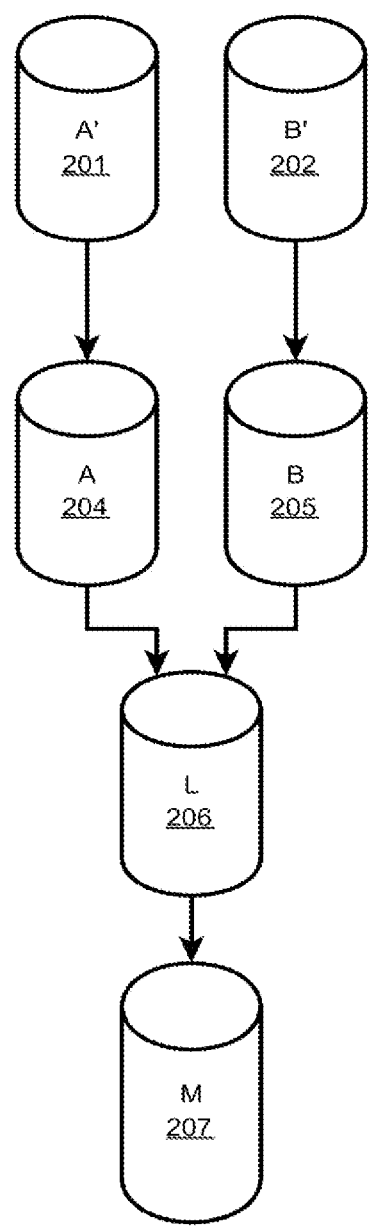
FIG. 2 schematically shows how the process of deduplication fits into record linkage using six example database structures according to one embodiment.

FIG. 2 schematically shows how the process of deduplication fits into record linkage using six example database structures according to one embodiment. Database A' 201 undergoes deduplication to become A 204, and database B' 202 undergoes deduplication to become B 205, etc. Also depicted is linkage that might follow the deduplication process. The figure depicts databases 204 and 205 being linked to database 206 then merged into 207.

The processes described in connection with FIG. 1 and FIG. 2 can be implemented in a data processing system configured for intercepting database queries from a computer program for delegation to a memory data grid. The system can include a host computer communicatively coupled to a database management system over a computer communications network. The database management system can provide functionality operable to access data stored in a database.

The host computer can include at least one processor and memory and can support the execution of one or more computer programs. A database driver can be logically coupled to the computer program either as part of the computer program executing in the memory of the host computer, or remotely over an interprocess communications linkage. The database driver can provide an interface to the computer program for performing query operations on data in the database in the database management system.

FIG. 1 may be illustrated more clearly with reference to FIG. 3 depicting four representations of embodiment sample data tables 301, 302, 303, 304 exemplifying linkage according to the embodiment in FIG. 1. Tables 301 and 302 represent two hypothetical, distinct unlinked tables as might appear in the two databases 101 and 102. As is common, tables 301 and 302 each have an identifier attribute. For example, the first table 301 contains a unique identifier, a.id, in the first column for each record. The identifier for each row/record is followed by attributes name, phone, address, and field.X. The second table 301 also contains a unique identifier, b.id, followed by some similar attributes as in table 301. Although the tables have similar structures, there are differences. For example, the attribute field.X is only found in the first table 301, and the attribute field.Y is found only in table 302. Note also that similar attributes contain different data. For example the attribute phone in 302 has a value for each record whereas attribute phone does not, i.e., it contains a record "a005382" with the phone attribute as "NA".

The linkage table 303 contains hypothetical data as might appear in database 104. The linkage table 303 is created using, for example, the method of the embodiment shown in FIG. 11 and its accompanying description. The resulting linkage table 303 has gathered records from tables 301 and 302 that refer to the same entities, and has provided a unique identifier L.id for each set of records for the same entity. For example, the records "a012744" in table 301 and "b0177" in table 302 all refer to the same entity, namely "Wo Hop Restaurant" and are assigned the L.id identifier "L00378".

The master table 304 contains hypothetical data as might appear in database 105. The master table M contains combined information from tables 301 and 302 in the sense that there is only one record per entity, e.g., "Wo Hop Restaurant". Note that the merged table 304 has all of the attributes from tables 301 and 302 including field.X and field.Y. Also, data for similar attributes has been merged to improve the record's completeness. For example, in the record for "Hunan's Kitchen", the phone number is drawn from table 302, and the address from table 301. Thus the end result is a database 105 with a master table 304 that solves the problems inherent in unlinked databases 301 and 302, most particularly completeness and accuracy.

Before separate tables are linked, it is preferable that each individual table is checked for duplicates and deduplicated. FIG. 5 depicts a representation of a data table with example parameters for the deduplication process according to one embodiment. In FIG. 5, a pass is specified by the key parameters shown here in the column headings. As will be shown, the blocking attributes are used to identify identical records. The distance attributes are used to measure the distance between records in a block. The max.distance columns specify the thresholds to be used: max.distance (multiple) when there is more than one potential link for a given record, and max.distance (unique) when there is only one potential link for a given record. Typically the unique threshold is set to be higher (less restrictive) than the multiple threshold, as there is more uncertainty in choosing between several candidates for a linkage than simply accepting or rejecting a unique linkage. The attribute weights specify the weights $w_i$ to be used on the distance measures for the distance attributes. For example, pass 1 on this table defines a linkage pass similar to the example of FIG. 7.

Figure 4:
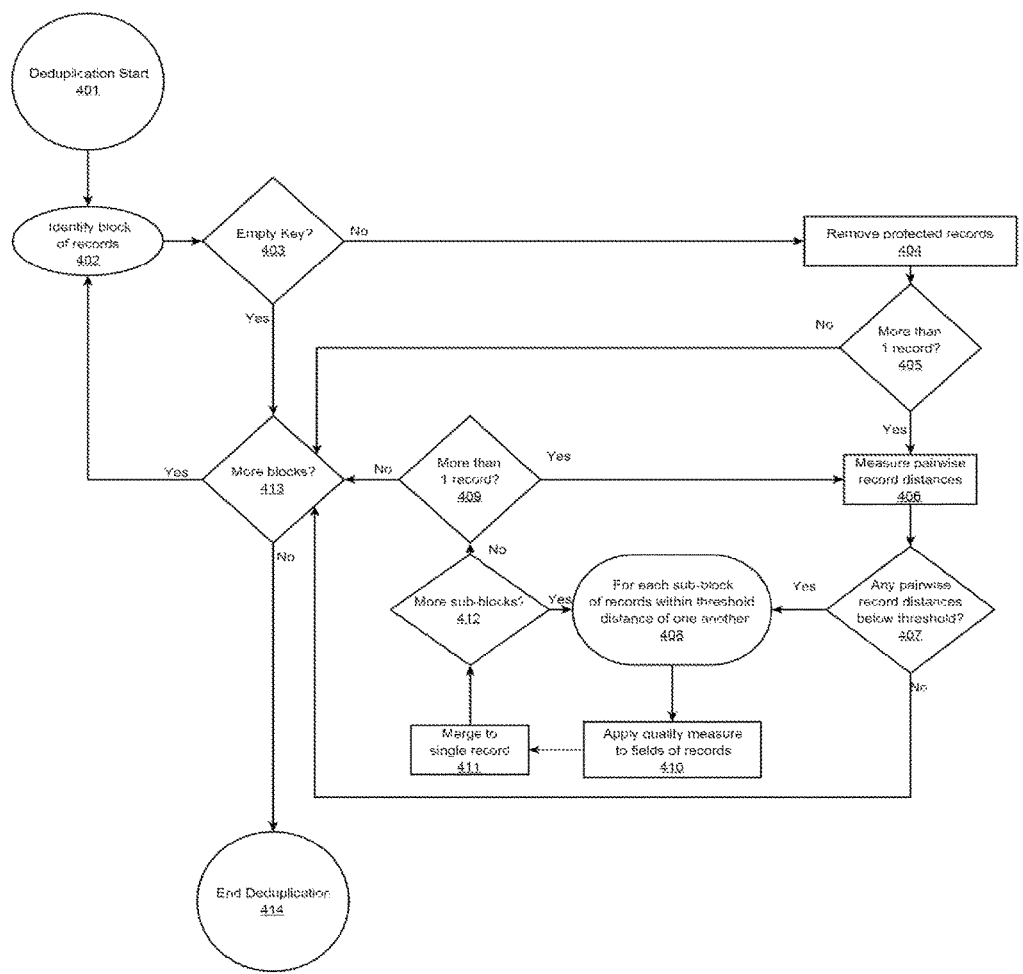
FIG. 4 is a flow chart of the multipass deduplication process according to one embodiment.

FIG. 4 shows a flow chart representing one embodiment of a multipass deduplication method. FIG. 5 can be described as depicting a representation of a table with hypothetical parameters that could be utilized in the process depicted in FIG. 4. For each pass in FIG. 5, there are a different set of parameters defining the multiple passes of FIG. 4 until all records with that particular key have been deduplicated. Then the process moves on to the next pass of FIG. 5 for multipass deduplication with a different key value. Therefore, as the flowchart in FIG. 4 is described, where necessary, references to parameters of FIG. 5 will be made to assist with the description of the deduplication process.

In FIG. 4, the process starts at 401. The following step 402 in deduplication process is blocking based on an attribute such as that provided in pass 1 of FIG. 5 under "blocking attributes", which is phone. By choosing the phone attribute, for example, as the blocking parameter, records having the same standardized phone number will be located and considered for deduplication. Blocking in this manner greatly reduces the number of records for evaluation. A brute force approach without blocking would drastically increase the amount of computing resources and time to compare any given subset of records in the database. Different methods of blocking exist, with varying degrees of success at decreasing resource allocation and time efficiency. The goal is to use a key attribute, like those in the "Blocking attributes" attribute of FIG. 5 to limit the number of records in the database at issue to something more manageable.

A "block" is defined as the collection of records with a given key. For example, if the blocking attribute is phone as in pass 1 of FIG. 5, then a block would consist of all records in the database of interest with matching values for the phone attribute. For instance, if two records had the phone number (212) 123-4567 as the phone attribute, they would be added to the block of records for evaluation. The key can be more complex and include multiple blocking attributes. For example, if the key consists of two blocking attributes zip and address and the both have the values "10013" for zip and "253 CHURCH STREET" for address, they would be added to the block for evaluation. Accordingly, each key determines a block of one or more records, and it is this block of records that is processed for deduplication.

In the next step 403, the block is checked for an empty key attribute. An empty key attribute such as no phone number in the key attribute phone number would read all records with missing phone number data as potential matches for deduplication evaluation. Clearly this would result in a large set of unrelated records for comparison and is therefore undesirable. Since blocks are generated from empty key attributes are undesirable, one method of dealing with this is to add an optional parameter prohibiting empty key blocking, e.g., "Empty_key_prohibited" at step 403, which can be used to prohibit these records from becoming part of the block that is to be analyzed. In the case of an empty key attribute with the parameter "Empty_key_prohibited", the protected records are removed from the deduplication process in step 404. Protected records are records that the algorithm marks for merger or deletion, but that human intervention has previously determined should not be merged or deleted. As a consequence they are removed from the deduplication process If instead, a block of records with available matching key attributes has been identified, then the next step is 405 to determine whether there is more than one record. If the answer is no, then step 413 follows to determine whether there are more blocks for deduplication.

If the answer to step 405 is yes and there are multiple records, then the pairwise record distances are measured in step 406. Pairwise record distance is calculated mathematically as follows.

In equations 1 through 10, the pairwise record distance, or individual attributes, is represented as capital "D". Lowercase "d" is used to denote the distance function applied to distance attributes of a set of records prior to application of the weighted average distance function used to calculate D. Throughout this application, measures that satisfy these conditions are referred to as "compliant". The process of adjusting a measure so that it satisfies all of these conditions will be referred to as "making compliant". As in "this measure can be easily be made compliant . . . ."

Each distance measure is the distance between attributes that will be used to calculate pairwise record distances. In FIG. 5, the values for the attribute "distance attributes" are the values to be measured. Thus, for pass 1 in FIG. 5, the distance attributes are name, address, and lat.lon.

If any given distance attribute is represented as i, then for each distance attribute i in two records a and b, a distance function $d_i(a_i, b_i)$ is chosen, such that the image of $d_i$ is [0,1], on a domain of all the possible values for attribute i. In other words, the output of the function falls between zero and one inclusive. By convention, 0 will indicate complete similarity (no distance between elements) and 1 will indicate complete dissimilarity (maximum distance between elements). One skilled in the art would recognize that other conventions, in particular the opposite convention, are possible. In this patent, zero indicates that the values of the given attribute are identical, and 1 indicates that they are completely different:

$$d_i \rightarrow [0,1] \qquad (1)$$

Next, let a set of weights $w_i$ be chosen such that $$0 \le w_i \le 1 \qquad (2)$$

and $$\sum_i w_i = 1 \qquad (3)$$

A set of arbitrary weights can also be applied to each $d_i$ value such as those in the attribute "attribute weights" in FIG. 5. The weights in pass 1 of FIG. 5 correspond respectively to the distance attributes in pass 1. Note that for convenience that any arbitrary set of positive weights $x_i$ can be transformed to satisfy these two constraints by setting $$w_i = x_i / \Sigma_i x_i \qquad (4)$$

Then it follows that any weighted average distance function $$D(a, b) = \sum_i w_i d_i(a_i, b_i) \qquad (5)$$

will also have an image within [0,1]:

$$D \rightarrow [0,1] \qquad (6)$$

Each $d_i$ can have specialized handling of missing values. Useful options might include substitution with a defined default value, for example, a blank string or fixed numeric value, before evaluating distance, or simply returning a fixed value in [0,1]. Handling exceptions such as missing identifiers involves the creation of additional record rules in order to make d compliant. A further generalization can be defined to deal with missing data in a given attribute. Here, if the output of $d_i$ is allowed to take the special value of NA $$d_i \rightarrow ([0,1], NA) \quad (7)$$

Then the NA-removal version of D can be defined as follows $$D(a,b) = \frac{\sum_j w_j d_j(a_i, b_i)}{\sum_j w_j} \quad (8)$$

$$j \in (i \mid d_i(a_i, b_i) \neq NA) \quad (9)$$

$$D \rightarrow \begin{cases} [0,1] \\ NA \text{ (if all } d_i = NA) \end{cases} \quad (10)$$

In other words, D is the weighted average of the populated distances and disregards those NA. This is guaranteed to be in [0,1] unless all the distances are zero.

This measure D can be applied to records containing any kind of data. Such a measure is defined as a function that operates on two records, each of which contains a number of attributes. At least one attribute must be specified as a "distance" attribute. Other, non-distance attributes are ignored for purposes of measuring distance. Many well-known measures of distance, e.g., various fuzzy text distance measures, which have been defined between individual attribute values can be used directly as $d_i$ functions—i.e. making them compliant by satisfying the constraint in f(1) or can easily be transformed to be so.

Integrating standardization and distance has an important benefit. When the standardization step is always performed before measuring distance, distance can easily and dynamically be measured on data that is not already standardized. This allows the distance function to run on dynamic data that is merely retrieved from an outside data store. The unitary output of $d_i(a_i)$ can be defined to be the standardized value of $a_i$. Note that this is not to be confused with $d_i(a_i, a_i)$ which is by definition zero. This allows the same $d_i$ to be used to determine record blocking.

In step 406 of FIG. 4, the D values, i.e., the pairwise record distances, are measured, for each record pair. In step 407, the pairwise record distances are compared against threshold values such as those provided by example in FIG. 5. If any pairwise record distances are lower than the threshold value, then they will be evaluated for merger into a single record; a group of records within the block that have pairwise record distances below the threshold will be referred to as a "sub-block" in step 408.

FIG. 6 is now discussed as an example of how the pairwise distance measurements in step 406 are compared to threshold values from FIG. 5 in step 407 in one embodiment. The first table 601 shows the pairwise record distances in a block of four records. Each of the four records, a101, a102, a103, and a104, is compared with all the others; their pairwise distances are shown. If the threshold is set to 0.4 in this example, then the pairwise record distance for records a101 and a102 falls below that threshold and a101 and a102 are merged into the new sub-block as a single record, referred to here as a101.a102. Similarly, because records a103 and a104 have pairwise record distance below 0.4, they are merged into the record referred to here as a103.a104. Thus we have two new records in a sub-block resulting from the first merge in table 602, which can now be compared against each other using their new pairwise distance measure, which is 0.5 in this example. The new record distance of 0.5 is higher than the threshold of 0.4. Therefore, these two new records a101.a102 and a103.a104 will not be merged and the process of deduplication continues to its next step. Note that for simplification FIG. 6 does not show the application of quality measures during the merge as are carried out in step 410 of FIG. 4, though this is normally a step in the process of merging records as described below.

In step 409, an individual sub-block is checked for whether it has more than one record. A sub-block may contain some or all of the records from the original block. If a sub-block from step 408 does contain more than one record, then in step 410 the quality measures are applied. Quality measures are described in more detail during the discussion of FIG. 11. Essentially, they are used to determine how the records will be merged. For example, which of two phone numbers from two different records in two different databases will be merged into the final record.

After the quality measure is applied, then the matching records are merged in step 411. In step 412, a determination is made if any additional sub-blocks of records remain to be merged. If a sub-block does remain, then the quality measure and merging steps 408-411 are repeated for that sub-block. In fact, steps 408 through 411 are repeated until there are no more sub-blocks. When no more sub-blocks remain, the answer to step 412 is no and the process continues to step 406 in which the pairwise record distances for the remainder of the block are measured. Steps 408 through 412 are then repeated until no more blocks remain in to be processed. At this point, the answer to step 407 is no and the process returns to step 413 to determine if there are more blocks. If there are not, then the deduplication process ends at step 414.

FIG. 7 depicts a representation of two data tables as examples of the process of merging attributes during deduplication according to one embodiment. Tables 701 and 702 are example tables that could respectively appear in databases 201 and 204 or databases 202 and 205. The eight records in table 701 form four pairs of similar records. The records in table 702 show the four resultant records after deduplication. The records in table 702 show the resulting records that are kept. A quality measure is used to decide which records contain the best data to retain. The quality measure is a value such as a number representing the reliability of a particular record being the better choice. Quality measures are described in more detail during the discussion of FIG. 11. In this case, the quality measures appear as the attributes num.reviews. By way of example, records "a012744" and "a012745" from table 701 are merged into the first record of table 702 based on the quality measures appearing in the num.reviews attribute. Since "a012745" has a higher value for this attribute, it has a higher quality and its data is selected for entry into the merged table 702.

Figure 8:
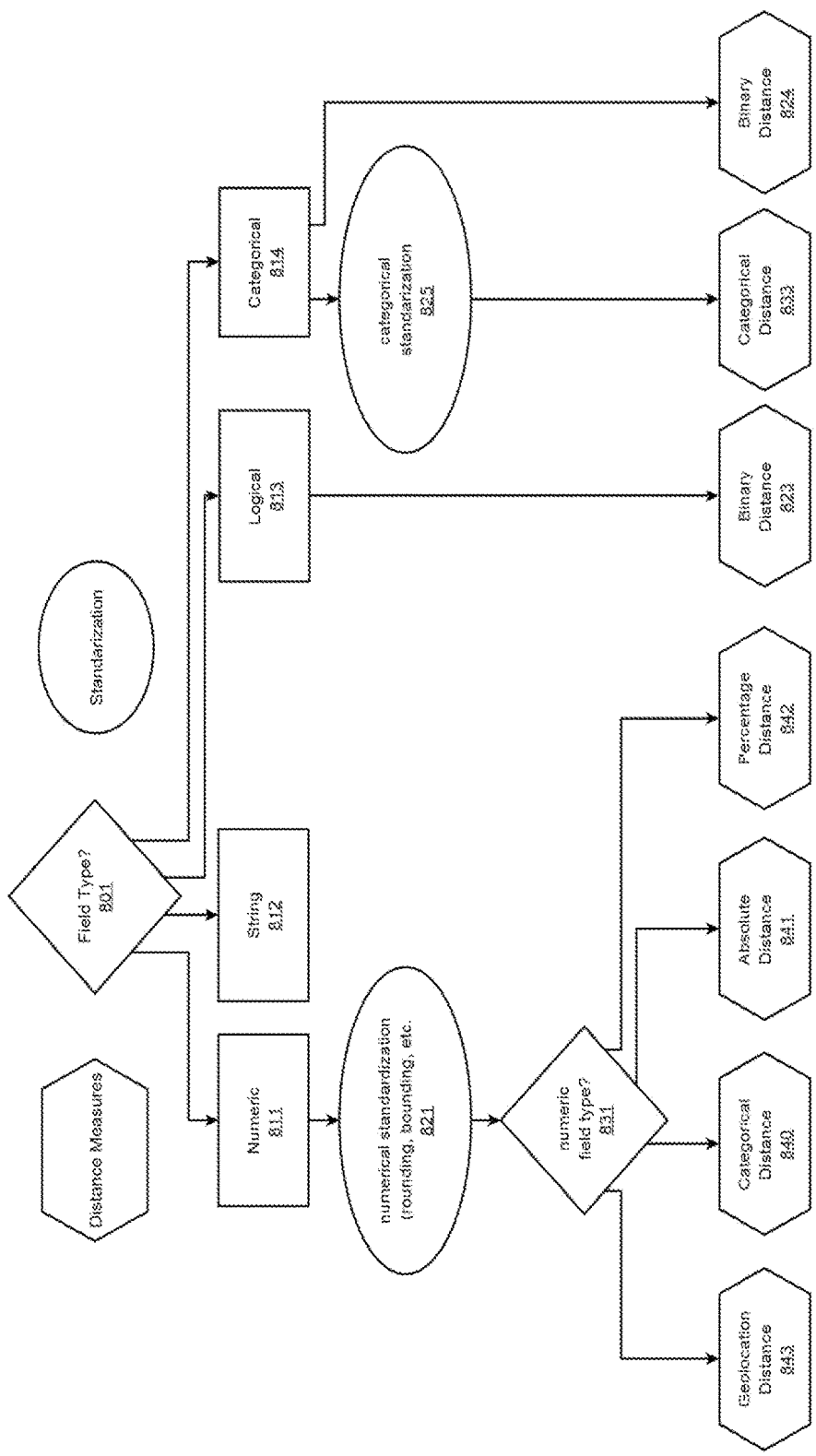
FIG. 8 depicts a flow chart of the realization of a distance measure by which records of numeric, categorical, and logical attributes can be compared according to one embodiment.

Several particular embodiments of the distance measure for different types of data are described now. FIG. 8 shows an example of how the various functions $d_i$ might be chosen, using a database containing attributes holding typical entity information according to one embodiment. For each attribute of a given type 801 various distance measures and standardization may apply to make the measure compliant. For a logical attribute 813 some kind of binary distance can be defined on the possible values T, F, NA for each value, yielding the cases in table 1001 of FIG. 10.

In FIG. 10 the six possible combinations TT, TF, FF, TN, FN, and NN are shown in one embodiment. Three examples of such a measure 1001 are shown, which vary in their treatment of missing values. In one distance measure "distance.1" 1001, the first three cases TT, TF, and FF show the intuitive distance measure of 0 for agreement and 1 for disagreement. Missing values produce NA. The next distance measure "distance.2" 1001 treats NA values as a third categorical type, and returns 0 for agreement and 1 for disagreement. The distance measure "distance.3" 1001 shows another possible treatment for missing values, using a default value of 0.5 when one of the two values is missing, and NA where both are missing. As this example should make clear, there are many other possible measures.

Categorical attributes in which an entry is restricted to one of a defined set of possible values 814 can be understood by analogy to example 1001. A binary distance 824 could be used (simple agreement and disagreement). A categorical standardization 825 might involve collapsing certain categories before comparison. Non-binary distances might be used in a categorical distance measure 833, if some categories were related. For example in 1002 of FIG. 10, consider data consisting of colors Blue (B), Yellow (Y) and Green (G). A measure that took into account that Blue and Yellow are completely dissimilar might be defined, but Blue and Green are somewhat similar, as are Yellow and Green.

Numeric attributes 811 can be made standardized 821 by various means if desired. Continuous values can be made fully or partially categorical if desired by rounding, bounding (replacing values above or below a threshold with that threshold), binning (replacing values in a range by a certain value, perhaps the midpoint), etc. The advantage of standardization is that it facilitates blocking. If standardization yields a completely categorical attribute, one might want to use a categorical distance measure 840 as discussed above. Different distance measures might be suitable or useful for different types of numerical data. "Absolute distance" 841 can be defined as the difference between two attribute values, made compliant in some fashion to satisfy equation (1). One approach is to divide by the maximum possible difference of the values that the attribute can take:

$$d_i(a,b) = \frac{|a-b|}{\max(i) - \min(i)} \quad (1)$$

An alternative approach is to simply constrain the output of the function by choosing an arbitrary maximum positive distance of K, and considering any larger difference as being the maximum value:

$$d_i(a,b) = \min\left(\frac{|a-b|}{K}, 1\right) \quad (12)$$

"Percentage distance" 842 can be defined in various ways to be made compliant. Two intuitive methods (for positive values) are listed below, analogous to the equations (11) and (12) above for absolute distance:

$$d_i(a,b) = \frac{|a-b|}{(a+b)} \bigg/ \frac{(\max(i) - \min(i))}{(\max(i) + \min(i))} \quad (2)$$

$$d_i(a,b) = \min\left(k\frac{|a-b|}{\left(\frac{a+b}{2}\right)}, 1\right) \quad (3)$$

Extensions and variations of these measures to deal with negative numbers, missing values, etc. can easily be made compliant (see discussion above around example 1001 in FIG. 10). Many other compliant numerical distance measures could be constructed to handle specific types of data. One useful extension of the idea of a distance measure is to define an operator that computes a measure on multiple related attributes (here for example two attributes i and j) of a record:

$$d_{ij}(a,b) \rightarrow [0,1] \quad (15)$$

An important example of such data is geolocation, which is typically stored as 2 numbers, latitude and longitude. A geolocation distance 843 can be defined as the physical distance between the points, and made compliant in some fashion. For example the Haversine formula can be used to calculate the physical distance H between two points defined by (lat,lon) of $((\phi_1,\lambda_1))$ and $(\phi_2,\lambda_2)$, with R=6357 km being the radius of the earth.

$$H = 2R\arcsin\left(\sqrt{\left(\sin^2\left(\frac{\phi_1 - \phi_2}{2}\right) + \sin^2\left(\frac{\lambda_1 - \lambda_2}{2}\right)\cos(\phi_1)\cos(\phi_2)\right)}\right) \quad (4)$$

For short physical distances, a reasonable approximation for H uses ordinary physical distance in a plane, adjusted for a given location:

$$H = \sqrt{k_\phi(\phi_1-\phi_2)^2 + k_\lambda(\phi_1-\phi_2)^2} \quad (17)$$

where $k_\phi$ and $k_\lambda$ are constants that are fixed for a given area. For example, in New York City, the values for $k_\phi=68.99$ and $k_\lambda=53.06$ will return H in miles.

Many other methods of making physical distances compliant are possible, including ones that take into account variations in the earth's radius. It is also possible to use other approaches such as a simple "Manhattan distance":

$$H = \sqrt{k_\phi}|\phi_1-\phi_2| + \sqrt{k_\lambda}|\lambda_1-\lambda_2| \quad (18)$$

Once physical distance is in some fixed units, it can be made compliant as per the previous discussion.

By similar methods, distances measures can be defined on any multi-dimensional location data, for example, the storage location of an object in inventory, which might be defined by row, aisle, or shelf. Many other possibilities abound.

Figure 9:
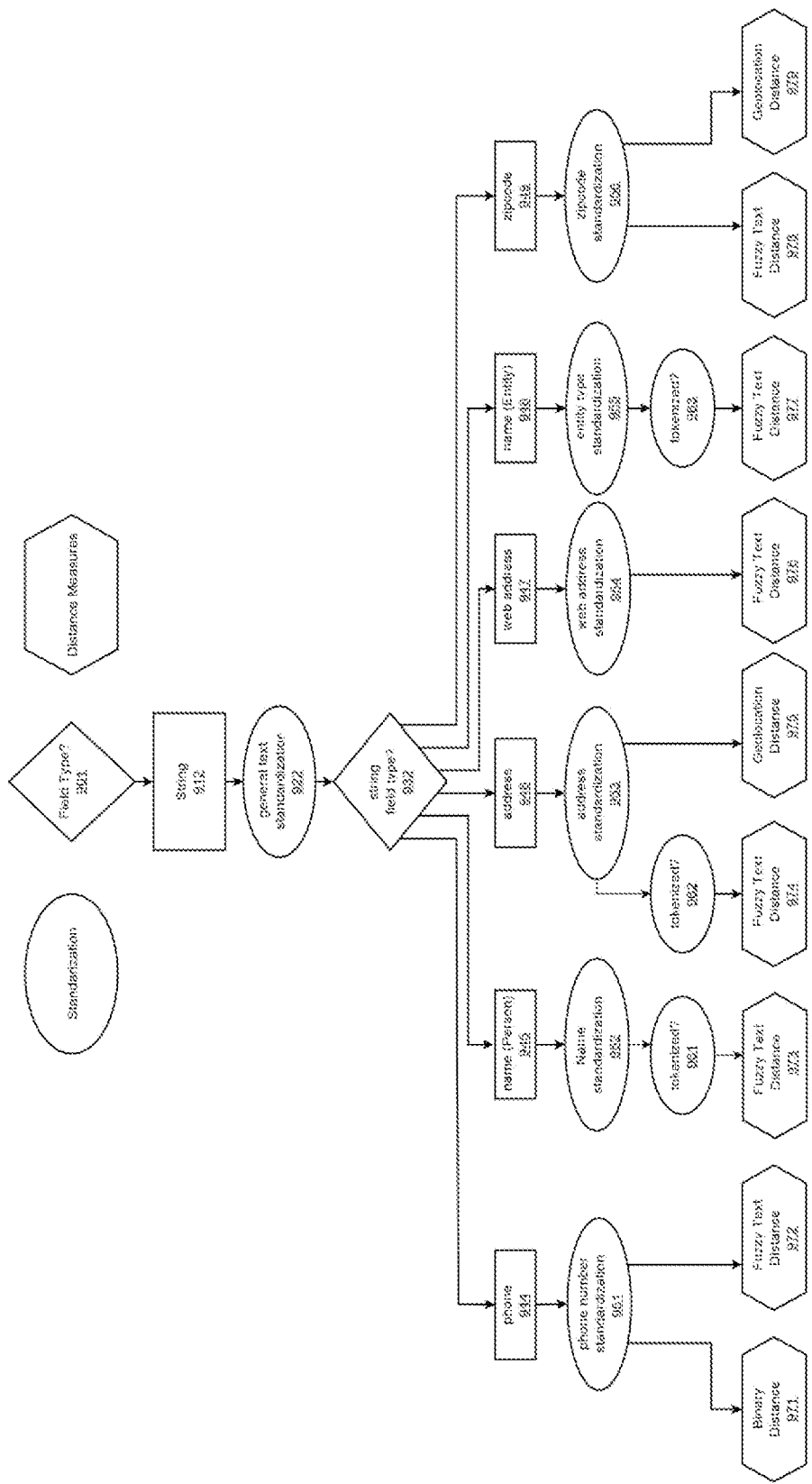
FIG. 9 depicts a flow chart of the realization of a uniform distance and standardization measure by which records consisting of multiple string attributes can be compared according to one embodiment.

FIG. 9 shows an example of how the various functions $d_i$ might be chosen, using a database containing attributes holding typical entity information, specifically string attributes, according to one embodiment. To make compliant distance measures for string attributes 912, the strings are processed with two levels of standardization, first a general one 922, and then depending on the type of attribute 932 a possible second, attribute-specific standardization 951-956. General text standardization 922 might consist of handling character encoding variations and diacritical marks, punctuation, capitalization, whitespace and other non-printing characters, etc. Attribute-specific standardization can be very useful, as distances can be made much more meaningful and comparable across attributes. A useful distance measure is one whose image spans a good proportion of the possible space [0,1], and which allows for distinctions between close matches and poor matches. With this in mind, some standardization examples will be provided for a range of string attributes that are found in the process of entity matching for people or businesses. Many other applications for record linkage exist involving many different types of string attributes. Many compliant distance measures could be devised to handle such data.

Much work in the attribute of record linkage has focused on the matching of personal name attributes 945. Many methods have been described, which can be used to devise an effective standardization and distance function. One aspect of name standardization 952 is possibly resolving a single name attribute into sub-attributes First, Last, Initial, Title, etc. Tokenizing 961 the attributes may be helpful (a process of matching substrings of a attribute). A table of abbreviations can be used to equate names like "Bill" with "William" and "Bob" with "Robert". Transformations to phonetic expressions such as SOUNDEX, NYSIIS, or Metaphone may be used as part of the name standardization step. Many measures have been described for fuzzy text distance 973. Some of them are either already compliant, or can be readily transformed to be compliant. For example, the Jaro-Winkler distance (d.JW) already has an image of [0,1], and $$d_i = (1 - d.JW) \qquad (19)$$

is a compliant distance measure.

For phone attributes 944 standardization involves providing a uniform format for digits, accounting for area codes and country codes, removing extensions if present, etc. Reasonable measures for phone numbers would include a simple binary distance 971—two numbers are either the same, or they are not. An alternative continuous measure could use fuzzy text distance 972 to account for input errors such as transposition of digits or include specialized measures that would allow matching of all but the last digit of a number since businesses often have multiple consecutive numbers.

Address attributes 946 have also received large amounts of attention in the literature of record linkage. The data can exhibit significant complexity. Addresses as well as other types of data such as phone numbers can be split into sub-attributes. For instance, addresses can be stored all in one attribute or in multiple sub-attributes such as street address, city, state, and zip code. Addresses can also be of different lengths. Different countries have different conventions for attribute order, and different formatting of postal codes. Address standardization 953 can involve multiple methods. The US Post Office has an algorithm for standardizing US addresses. This involves consistent abbreviations and naming conventions. A very useful standardization method is to create tables of alternate names. For example, "$6^{th}$ Avenue" and "Avenue of the Americas" are alternate names for the same road in New York City. A good standardization function will account for as many equivalences as possible. Parsing of unstructured or poorly structured address strings into consistent sub-attributes can be crucial. Tokenizing 961 can be very useful, as discussed above in the context of name standardization. Once an address is standardized, a suitable text distance measure 974 can be used. Alternatively, the standardized address can be converted into latitude and longitude coordinates using a geolocation service such those used by Google or Yahoo maps. Then the resulting coordinates can be used with a geolocation measure 975 as discussed above. The zip code attribute 949 can be used by itself, or conveniently with the address sub-address attribute, as will be shown below in examples of sequential linkage. Zip code standardization 956 can involve reconciling 5-digit and 9-digit variations, binning of geographically close zip codes, and error checking and data validation by comparing the zip code to the rest of the address or the geolocation coordinates. Zip code distance measures 978 and 979 can be applied, as per the discussion of address attributes in general.

Web address attributes 947 are a very useful tool in entity matching. Standardizing 954 these attributes makes a big difference in achieving a good measure. The essential point is that the common textual elements need to be stripped off so that the image of the distance measure covers a useful range. For example, a simple text distance measure defined based on the Jaro-Winkler function (equation (19)) will show that the web addresses "http://www.abc.com/" and "http://www.xyz.com/" are almost identical (distance=0.08), whereas the strings "abc" and "xyz" are completely dissimilar (distance=1.00). In addition to stripping off the "http://", "www.", and ".com/" pieces of the web address, a good standardization will also deal with web addresses that are not top-level domains, i.e., that do not end with .com, .net, .org, etc., or that include scripting or placement commands via characters like "?" or "#". Any text distance measure 976 can be used once standardization has been performed.

Entity names 948, such as restaurants in this case, benefit from standardization. One useful standardization 955 approach is to remove or standardize text that is descriptive of the category an entity belongs to, if that information is already known. For example, "Joe's Restaurant", "Joe's Bar and Grill", and "Joe's" might all be standardized to the same string. Although these strings will be seen as quite similar by some text distance measures, particularly ones that give priority to the first characters of a string, it is advantageous for the purposes of blocking to recognize them as identical. Tokenizing 963 can help to deal with differences in word order. Various text distance measures 977 can be used once standardization has been performed.

FIG. 11 shows a sample calculation of quality measures, in the context of record linkage. A record quality measure is shown for each quality attribute of three linked records "a012744", "b0177", and "c0425" appearing in databases A 1101, B 1102, and C 1103 respectively. In addition, a database quality measure, which is an overall measure of database quality is shown for each of databases A 1101, B 1102 and C 1103 in table 1104 as the attributes A, B and C respectively. A final quality can be calculated as a function of both the record quality and the database quality. Furthermore, a final quality can be calculated for every possible value for an attribute in databases A 1101, B 1102, and C 1103, as found in different linked records, which may or may not be in different databases.

In merging data from such records as "a012744", "b0177", and "c0425", the attribute values with the highest final quality will be chosen. When the linked records are in the same table, this is a part 410 of the deduplication process. When the linked records are in different databases, this is part of the linkage process that creates the master database 207.

Quality is defined in the following way. For a set of N linked records from databases DK, with record ids $id_K$, the quality of the n unique values ek of attribute i that appear in those records is assessed. (Note that $0 \le n \le N$). Then in formal notation:

$$\text{entry} \cdot \text{quality}(E_K) = \text{database} \cdot \text{quality}(D_K) * \text{record} \cdot \text{quality}(D_K[id_K]) \qquad (20)$$

$$\text{entry} \cdot \text{quality}(e_K) = \sum_{K=1}^{N} \text{entry} \cdot \text{quality}(E_K) \bigg|_{(e_k = E_K)} \qquad (21)$$

In other words, each possibly non-unique attribute, is assigned a value which is the product of the database quality and the record quality of the record it is found in. The quality measure can also be used as part of a more complex process for deciding when to change data. For example, a change might be required in entry to exceed the existing value by a certain amount before accepting a change. Multiple values for a given entry might also be stored along with their quality scores.

The quality functions database.quality( ) and record.quality( ) can be defined in various ways. Database quality can be assigned as a fixed value for different sources, or it can be calculated on the basis of properties of the sources themselves. Some factors in creating this quality measure might be the overall accuracy rate of the data as measured by some external validation process, the overall amount of data, or the rate of activity/number of users involved in data creation. Many other possibilities exist. The record.quality function will typically use data found in some attributes of the given record. Attributes that might be useful in creating a record.quality( ) function might include the number of reviews of a record, the number of page views, the users' assessment of record accuracy, the date of the last review, or whether the information has been confirmed, etc. Note that record.quality( ) is defined on a record of a database—it can but does not need to be defined in the same way for different databases, which may have different attributes available for constructing a quality measure. Scaling of the record.quality( ) across databases has a great effect on the entry.quality definition (equation (20)), so care should be taken that quality values from different databases are comparable. Moreover, instead of record quality, an attribute quality measure could be used. To explain, different quality measures could be used for less than all the attributes in a particular record. For example, when basing a merge on data from a website for entities like restaurants with user reviews and the like, we could use the "number of user reviews" attribute from the website data store as a quality measure for attributes concerning the quality of the food such as an attribute rating the quality as good, bad, or excellent. A different attribute from the same website data store such as "number of page views" could also be used as an attribute quality measure for attributes such as restaurant name and location. In such a case we could simply use attribute quality in place of the record quality when calculating entry quality for the particular attribute to which the attribute quality applies. This could result in a final merge of records into a database with potentially more accurate data than were only a record quality to be used. One of ordinary skill in the art will recognize that record quality and attribute quality could be combined in many different ways in many different scenarios for different entities and data stores when merging into a master database to achieve a final quality for attributes and therefore records that is more useful, reliable, or accurate.

In the example of FIG. 11, the database quality 1104 is a fixed quantity that varies for each database. The aim is to create a single record in the master database M 1108, with the best most accurate values for the three attributes name, phone, and address. The record qualities for each record in each database are the same attribute, quality, but they vary for different records. Thus you have varying database qualities and record qualities used to calculate the entry quality for each attribute in the record. The calculation (21) above, is straightforward. For example, the entry value for each attribute in 1101 will be 10, which is the product of the database quality 1 and the record quality 10. The entry qualities for each attribute in 1102 and 1103 will respectively be 20 and 15.

Next, to decide which values for each attribute will be used in the final merged record, we sum the entry qualities for each unique attribute value, for example name, that are the same and compare those final quality values between each value in 1105. In 1105, the value "Wu Hop" has a quality of 15, which is simply its entry quality, because there are no duplicates for which the entry qualities would be summed. The value "Wo Hop Restaurant", however, appears in the name attributes for two records from different records for different databases 1102 and 1103. Therefore, its final value, the sum of its entry values, is 30, the sum of 20 for 1102 and 10 for 1101. Thus, the best value for the merged master database is the value with the highest final quality, "Wo Hop Restaurant" 1105. Similar calculations show that the best entry for phone 1106 is "212-566-3841" rather than "212-566-9999". The best entry for address 1107 is "17 Mott St" rather than "15 Mott St". Note the flexible nature of this quality measure, which has blended information attribute by attribute from the various sources, rather than simply choosing an entire record as the best. The result in M is different from all the input records. This method produces different results from a more naïve precedence algorithm, which might simply choose all the information, that is, all the attribute values, from one record over another. Another option would be to retain all of the attributes along with their final qualities in the merged database, such that a record might have both values for the name attribute, e.g., "Wo Hop Restaurant" and "Wu Hop" along with attributes for their respective final quality values 30 and 15 respectively. This might be useful to calculate a percentage accuracy of the two different names.

The calculation of quality measures in the context of deduplication is exactly the same as described above (equations (20) and (21)). In this case the records are drawn from the same database, so the database.quality factor is by definition the same for all records, and can be ignored if desired.

FIG. 12 shows some records from an attempt at linking records from two databases, A and B. The table contains records that will be used to create a linkage table similar to the table 303. This example illustrates the typical challenges of record linkage, as well as the benefits of the use of a uniform distance measure and a multi-pass approach. The table shows records that have been blocked using the corresponding attributes a.phone and b.phone. All the records shown have identical values for these attributes. The records have been sorted by the column dist.A.B, which shows the distance between the two records, using the name, address and geolocation attributes. Examination of the name columns by a human reviewer reveals that some of these records are poor matches (highlighted in bold type), while some are good matches. Notice that the first four records are good matches, while there are multiple bad matches after these four. By applying a cutoff at a value between the distance values given, say at 0.3, the close matches can be kept and the remainder can be left for another linkage attempt.

Figure 13:
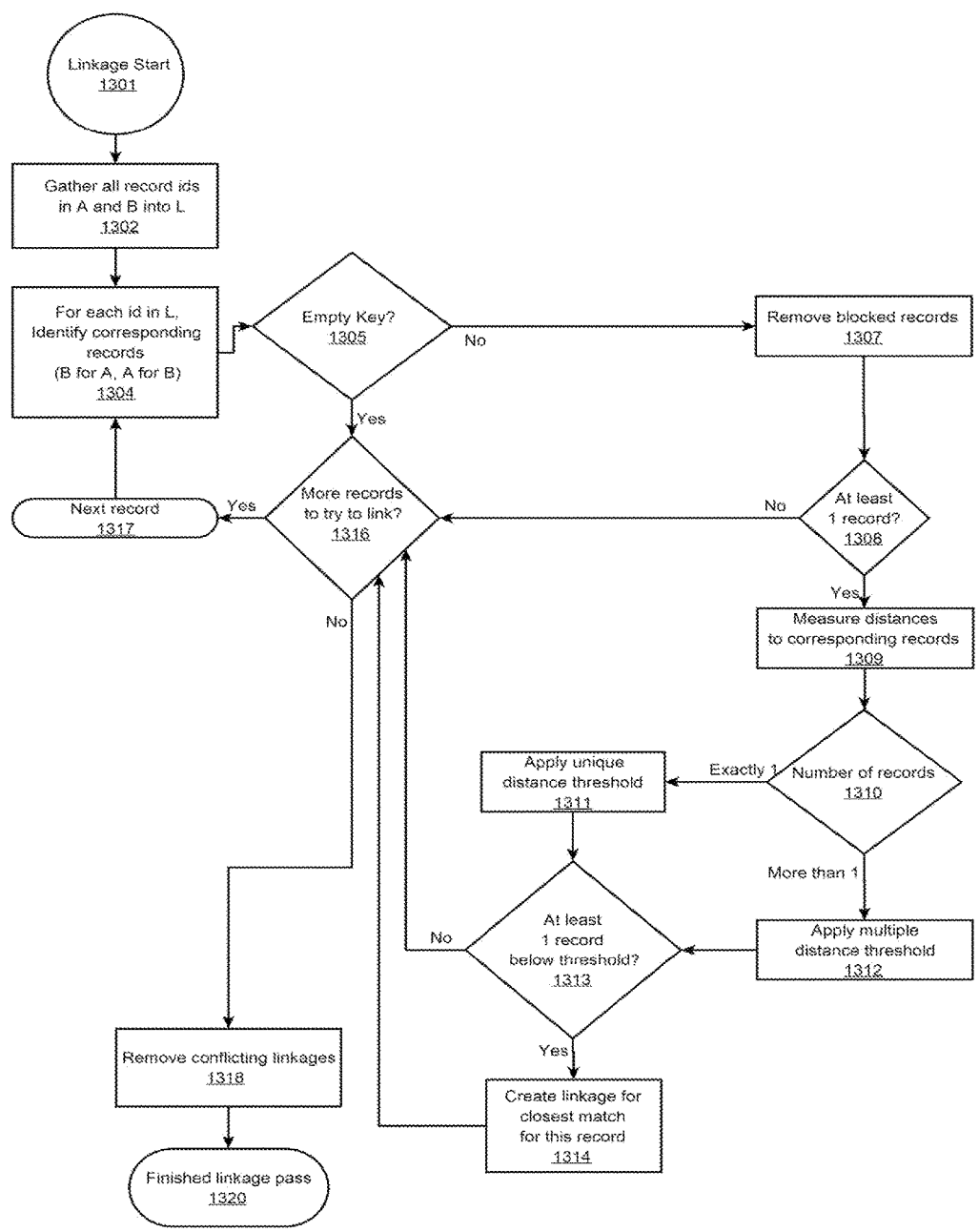
FIG. 13 depicts a flow chart of the linkage process according to one embodiment.

FIG. 13 describes an exemplary flow of the linkage process according to one embodiment. The process is described with databases corresponding to those in FIG. 1. In this embodiment, the process starts with the two unlinked databases 101 and 102 at step 1301. In step 1302 all the records are gathered from these two databases 101 and 102 into the new linkage database 104. Thus, when database 104 is first created, records are created for every record in 101 and every record in 102. Each record from database 101 in database 104 will have an attribute for the id attribute from database 102 but it will be filled with NA, meaning that no link to a record from 102 is yet defined, and vice versa. Moreover, each record in 104 will contain a unique identifier attribute, for example L.id, with the purpose of eventually referencing each set of linked records with a single attribute. Using the blocking attributes, potentially matching records are identified in step 1304. In other words, in step 1304 records are identified from 101 for 102 and from 102 for 101 to form blocks of potentially matching records based on blocking attributes like those in FIG. 5 in the "blocking fields" attribute. Potentially matching records in 104 are still unlinked at this point. Empty keys in step 1305 are handled in a similar manner as in step 403 from FIG. 4. Next, in step 1307, from the block of potential matches, blocked records that have been previously flagged as prohibited matches by manual intervention are removed.

After step 1307, a determination is made as to whether there is at least one record to work with in step 1308. If so, then in step 1309, the pairwise record distance measure is used to calculate the distances from the current record to all the potentially matching records in the particular block of interest. If not, then the next step is 1315, because there is no link between the records. Depending on the number of potentially matching records, in step 1310 either the unique threshold, such as that in FIG. 5, is applied in step 1311 or the multiple threshold, such as that in FIG. 5, in step 1312. Following either step 1311 or step 1312, the next step is 1313 where a determination is made as to whether there is at least one record beneath whichever threshold value was used in either step 1311 or 1312. If there is at least one record that satisfies the threshold constraint in step 1314, a linkage is created using the linkage ID attribute, for example L.id., in FIG. 3 using the closest match. Otherwise this record is skipped without creating a linkage. In step 1316, a determination is made as to whether there are more records to link with the next record in step 1317 and the process begins its next iteration in the following step 1303. If there are no more records to link, then the next step is to remove conflicting linkages 1318. This means that if a record in 101 has been linked by more than one record in 102, those conflicting links are removed, and similarly for records in 102. Symmetrical linkages should be left—a record in 101 linked to a certain record in 102, and that record in 102 linked back to the same record in 101. After step 1318, the process is finished at step 1320. One of ordinary skill in the art would understand how to program the steps of the process in FIG. 13 from the description herein.

Although the invention has been described in detail with particular reference to some embodiments, other embodiments can achieve the same or similar results. Upon studying this application, those skilled in the art will realize other equivalent variations and/or modifications that can also be used. For instance, although the embodiments described in this invention primarily focus on merging two tables, those skilled in the art will realize that the invention is not limited to any number of databases. Also, although the embodiments focus on databases, they can be applied to all types of data stores including data repositories like websites. Moreover, persons of ordinary skill in the art of record linkage will understand how to program where necessary for the descriptions in this patent from the description provided. It is intended that the claims contained in any patent issued on this application cover all such equivalents. The entire disclosures of all references, applications, patents, and publications cited above are hereby incorporated herein by reference.

What is claimed is:

1. A computer implemented method of association of data records, comprising:

receiving a first specification for a distance measure for each attribute in a subset of attributes of data records in one or more databases where each said distance measure is between zero and one inclusive;

receiving a second specification for a set of non-negative weights for each attribute in said subset of attributes where the sum of said set of weights is equal to one;

receiving a third specification for one or more threshold values;

calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;

associating a subset of said considered records where said pairwise record distance for said subset of records is within the applicable said threshold value; and measuring physical distance between record items based on latitude and longitude, and wherein said physical distance is normalized to be compliant.

2. The method of claim 1, further comprising:

merging into a single database said subset of said considered records where said pairwise record distance for said subset of records is within the applicable said threshold value.

3. The method of claim 2, wherein all of the steps are repeated sequentially based on different parameters for said distance measure, said weights, and said thresholds.

4. The method of claim 1, wherein associating said considered records is prevented where said considered records have missing data in their key attributes.

5. A computer implemented method of association of data records, comprising:

receiving a first specification for a distance measure for each attribute in a subset of attributes of data records in one or more databases where each said distance measure is between zero and one inclusive;

receiving a second specification for a set of non-negative weights for each attribute in said subset of attributes where the sum of said set of weights is equal to one;

receiving a third specification for one or more threshold values;

calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;

associating a subset of said considered records where said pairwise record distance for said subset of records is within the applicable said threshold value; and standardizing text attributes in a first stage and a second stage, wherein said first stage is standardizing character-level matching considerations, and wherein said second stage is standardizing content of each attribute.

6. A computer implemented method of association of data records, comprising:

receiving a first specification for a distance measure for each attribute in a subset of attributes of data records in one or more databases where each said distance measure is between zero and one inclusive;

receiving a second specification for a set of non-negative weights for each attribute in said subset of attributes where the sum of said set of weights is equal to one;

receiving a third specification for one or more threshold values;

calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;

associating a subset of said considered records where said pairwise record distance for said subset of records is within the applicable said threshold value; and wherein said threshold value differs based on how many said records are found similar using key parameters.

7. A computer implemented method of association of data records, comprising:

receiving a first specification for a distance measure for each attribute in a subset of attributes of data records in one or more databases where each said distance measure is between zero and one inclusive;

receiving a second specification for a set of non-negative weights for each attribute in said subset of attributes where the sum of said set of weights is equal to one;

receiving a third specification for one or more threshold values;

calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;

associating a subset of said considered records where said pairwise record distance for said subset of records is within the applicable said threshold value;

receiving a fourth specification for a database quality measure;

receiving a fifth specification for a record quality measure;

calculating an entry quality measure for each attribute as the product of said database quality measure and said record quality measure;

calculating a final quality measure for each unique attribute value as the sum of said entry qualities for each identical attribute value; and selecting one of the unique attribute values for merger into a record in a database, wherein the unique attribute value selected is based on a comparison of said final quality measures.

8. The method of claim 7, further comprising:
merging said unique attribute value selected into a record in said database.

9. The method of claim 7, further comprising:
merging all said attribute values along with said final quality values for each said attribute value as attributes into a record in said database.

10. The method of claim 7, wherein said record quality measure includes attribute values from values in a data store that indicate one or more of the following: a number of reviews of information pertaining to entities upon which said records are based, a number of website page views for one or more pages relating to the entities upon which said records are based, user assessments of information relating to the entities upon which said records are based, a date of the last review of the information pertaining to the entities upon which the records are based, or whether the information pertaining to the entities upon which the records are based has been confirmed as accurate.

11. The method of claim 7, wherein said database quality measure is determined from one or more of the following: an amount of data in a database, a rate of data creation in a database, or a number of users of a database.

12. The method of claim 7, further comprising:
merging information from source databases according to said final quality while retaining a plurality of candidate values for a plurality of said attributes along with their said final quality measures.

13. A computer implemented method of association of data records, comprising:

receiving a first specification for a distance measure for each attribute in a subset of attributes of data records in one or more databases where each said distance measure is between zero and one inclusive;

receiving a second specification for a set of non-negative weights for each attribute in said subset of attributes where the sum of said set of weights is equal to one;

receiving a third specification for one or more threshold values;

calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;

associating a subset of said considered records where said pairwise record distance for said subset of records is within the applicable said threshold value;

receiving a fourth specification for a database quality measure;

receiving a fifth specification for one or more attribute quality measures;

calculating an entry quality measure for each attribute as the product of said database quality measure and said attribute quality measure;

calculating a final quality measure for each unique attribute value as the sum of said entry qualities for each identical attribute value;

selecting one of the unique attribute values for merger into a record in a database, wherein the unique attribute value selected is based on a comparison of said final quality measures; and merging said unique attribute value into a record in a database base.

14. The method of claim 13, wherein said attribute quality measure includes attribute values from values in a data store that indicate one or more of the following: a number of reviews of information pertaining to entities upon which said records are based, a number of website page views for one or more pages relating to the entities upon which said records are based, user assessments of information relating to the entities upon which said records are based, a date of the last review of the information pertaining to the entities upon which the records are based, or whether the information pertaining to the entities upon which the records are based has been confirmed as accurate.

15. A computer readable non-transitory storage medium comprising instructions executable by a processor for:
- receiving a first specification for a distance measure for each attribute in a subset of attributes of data records in one or more databases where each said distance measure is between zero and one inclusive;
- receiving a second specification for a set of non-negative weights for each attribute in said subset of attributes where the sum of said set of weights is equal to one;
- receiving a third specification for one or more threshold values;
- calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;
- associating a subset of said considered records where said pairwise record distance for said subset of records is within the applicable said threshold value;
- receiving a fourth specification for a database quality measure;
- receiving a fifth specification for a record quality measure;
- calculating an entry quality measure for each attribute as the product of said database quality measure and said record quality measure;
- calculating a final quality measure for each unique attribute value as the sum of said entry qualities for each identical attribute value; and
- selecting one of the unique attribute values for merger into a record in a database, wherein the unique attribute value selected is based on a comparison of said final quality measures.

16. A computer readable non-transitory storage medium comprising instructions executable by a processor for:
- receiving a first specification for a distance measure for each attribute in a subset of attributes of data records in one or more databases where each said distance measure is between zero and one inclusive;
- receiving a second specification for a set of non-negative weights for each attribute in said subset of attributes where the sum of said set of weights is equal to one;
- receiving a third specification for one or more threshold values;
- calculating a pairwise record distance between a plurality of considered records, wherein the pairwise record distance is the weighted sum based on said non-negative weights and each said distance measure for the entire subset of said subset of attributes, and wherein the pairwise record distance falls between zero and one inclusive;
- associating a subset of said considered records where said pairwise record distance for said subset of records is within the applicable said threshold value;
- receiving a fourth specification for a database quality measure;
- receiving a fifth specification for one or more attribute quality measures;
- calculating an entry quality measure for each attribute as the product of said database quality measure and said attribute quality measure;
- calculating a final quality measure for each unique attribute value as the sum of said entry qualities for each identical attribute value;
- selecting one of the unique attribute values for merger into a record in a database, wherein the unique attribute value selected is based on a comparison of said final quality measures; and
- merging said unique attribute value into a record in a database base.

* * * * *